United States Patent
Weisman, II et al.

Patent Number: 5,647,317
Date of Patent: Jul. 15, 1997

[54] METHOD FOR ENGINE CONTROL

[76] Inventors: S. Miller Weisman, II, 34650 Valley Forge, Farmington Hills, Mich. 48018; Dennis M. Letang, 768 Sorel Dr., Canton, Mich. 48188; Douglas J. Babcock, 22176 Brookfield, South Lyon, Mich. 48178

[21] Appl. No.: 673,199

[22] Filed: Jun. 27, 1996

Related U.S. Application Data

[62] Division of Ser. No. 535,617, Sep. 28, 1995, Pat. No. 5,615,654, which is a division of Ser. No. 113,424, Aug. 27, 1993, Pat. No. 5,445,128.

[51] Int. Cl.$^6$ ................................ F02B 3/12; F02M 45/04
[52] U.S. Cl. ................................ 123/299; 123/436
[58] Field of Search ................................ 123/299, 300, 123/436; 364/431.05

[56] References Cited

U.S. PATENT DOCUMENTS

| | | | |
|---|---|---|---|
| 1,239,523 | 9/1917 | Rogers | 123/300 |
| 2,627,254 | 2/1953 | De Juhasz | 123/299 |
| 3,439,655 | 4/1969 | Eyzat | 123/300 |
| 3,827,419 | 8/1974 | Isomura | 123/300 |
| 4,022,165 | 5/1977 | Eckert et al. | 123/300 |
| 4,186,693 | 2/1980 | Thein et al. | 123/41.12 |
| 4,367,706 | 1/1983 | Scheying | 123/300 |
| 4,425,766 | 1/1984 | Claypole | 123/41.12 |
| 4,671,232 | 6/1987 | Stumpp et al. | 123/300 |
| 4,697,561 | 10/1987 | Citron | 123/339 |
| 4,711,209 | 12/1987 | Henkel | 123/300 |
| 4,745,898 | 5/1988 | Egler et al. | 123/300 |
| 4,766,863 | 8/1988 | Fujimori | 123/357 |
| 4,782,803 | 11/1988 | Kikuchi | 123/300 |
| 4,838,232 | 6/1989 | Wich | 123/506 |
| 4,936,277 | 6/1990 | Deutsch et al. | 123/436 |
| 4,941,098 | 7/1990 | Yasukawa et al. | 123/350 |
| 4,943,923 | 7/1990 | Naito | 364/426.04 |
| 5,003,483 | 3/1991 | Hedström | 364/426.04 |
| 5,019,986 | 5/1991 | Londt et al. | 364/426.04 |
| 5,054,445 | 10/1991 | Henkel et al. | 123/300 |
| 5,090,379 | 2/1992 | Ito | 123/299 |
| 5,103,785 | 4/1992 | Henkel | 123/299 |
| 5,117,793 | 6/1992 | Taue et al. | 123/436 |
| 5,156,128 | 10/1992 | Nakagawa | 123/436 |
| 5,165,373 | 11/1992 | Cheng | 123/300 |
| 5,203,423 | 4/1993 | Fujiwara et al. | 180/179 |
| 5,235,512 | 8/1993 | Winkelman et al. | 123/352 |
| 5,243,523 | 9/1993 | Stepper et al. | 364/424.1 |
| 5,261,374 | 11/1993 | Gronenberg et al. | 123/436 |
| 5,265,575 | 11/1993 | Norota | 123/436 |
| 5,307,644 | 5/1994 | Cummins et al. | 123/41.12 |
| 5,331,933 | 7/1994 | Matsushita | 123/295 |
| 5,343,780 | 9/1994 | McDaniel et al. | 477/108 |
| 5,385,129 | 1/1995 | Eyberg | 123/436 |
| 5,402,760 | 4/1995 | Takeuchi et al. | 123/300 |
| 5,445,128 | 8/1995 | Letang et al. | 123/436 |
| 5,469,826 | 11/1995 | Thomas et al. | 123/488 |
| 5,481,909 | 1/1996 | Deutsch et al. | 123/436 |

*Primary Examiner*—Willis R. Wolfe

[57] ABSTRACT

A method for comprehensive integrated control of a compression-ignition internal combustion engine having integral fuel pump-injectors utilizing an electronic control unit is disclosed. The control strategy integrates various functions of engine control including fuel delivery, cooling fan control, engine speed governing and overspeed protection, engine braking, torque control, and vehicle speed diagnostics and control. Cooling fan control is integrated with vehicle speed diagnostics and control as well as fuel delivery to provide an integrated cruise control function which incorporates engine braking. The method also includes improved control over the various engine speed governors while improving idle quality by balancing the power delivered by each of the engine cylinders when at idle. The integrated torque control employs functions to reduce NOx emissions and noise utilizing adaptive fuel delivery timing and a split injection strategy.

16 Claims, 10 Drawing Sheets

METHOD FOR ENGINE CONTROL

This is a divisional of application Ser. No. 08/535,617 filed on Sep. 28, 1995, now U.S. Pat. No. 5,615,654 which is a divisional of application Ser. No. 08/113,424 filed on Aug. 27, 1993, now U.S. Pat. No. 5,445,128.

TECHNICAL FIELD

The present invention relates to a method for controlling a compression-ignition internal combustion engine.

BACKGROUND ART

In the control of compression-ignition internal combustion, or diesel engines, the conventional practice utilizes electronic control units having volatile and nonvolatile memory, input and output driver circuitry, and a processor capable of executing a stored instruction set, to control the various functions of the engine and its associated systems. A particular electronic control unit communicates with a plethora of sensors, actuators, and other electronic control units necessary to control various functions which may include fuel delivery, cooling fan control, engine speed governing and overspeed protection, engine braking, torque control, vehicle speed control, or myriad others.

Traditionally, complex systems and subsystems which perform critical functions required separate control units which could promptly respond to dynamic vehicle situations and initiate appropriate actions. For example a vehicle may have employed a brake controller, a cruise control module, a cooling fan controller, an engine controller, and a transmission controller such that each vehicle system or subsystem had its own stand-alone controller. These controllers were either electronic control units or electronic circuits which may have had little or no communication among themselves or with a master controller. Thus the vehicle operated by necessity as a distributed control system which often made it difficult to optimize overall vehicle performance, by coordinating control of the various systems and subsystems.

As control systems became more sophisticated, the various distributed controllers were connected to communicate status information and coordinate actions. However, inter-controller communication delays were often unacceptable for critical control tasks, thus requiring independent processors or circuitry for those tasks. This expanded the overall capabilities of the control system and was often necessary to meet increasing consumer demands as well as more stringent emission control standards. More recently, noise control standards have been implemented which are of special concern to diesel engine applications.

To meet these stricter standards, it has been necessary to expand the capabilities of the engine control system to more accurately control the engine operation. The complexity of the resulting control systems has often resulted in difficulty in manufacturing, assembling, and servicing them. Manufacturers have attempted to decrease part proliferation, while increasing the accuracy of control, by combining increasingly more control functions into one controller.

Advancements in microprocessor technology have facilitated the evolution of engine control systems. These systems began by implementing relatively simple control functions with mechanical apparatus, and progressed to more involved control schemes with dedicated controllers, before having matured as complex control strategies realized by a comprehensive engine controller. Many engine control systems found in the prior art address only a single subsystem control strategy and fail to capitalize on the advantages afforded by these microprocessor advancements. For example, U.S. Pat. No. 4,782,803 issued to Kikuchi discloses a stand-alone system and associated method of fuel injection control for compression-ignition internal combustion engines. However, there are no provisions for integrating the control of fuel delivery with other functions to harmonize control of the engine and vehicle subsystems. This is necessary to optimize performance in areas such as fuel economy, driveability, noise, and emissions.

Traditionally, emission control standards could be satisfied using control strategies which responded only to changes in local operating conditions such as engine load and temperature. A comprehensive integrated control strategy was unnecessary and often difficult or economically unfeasible to implement. However, more exacting emissions standards would require emissions to respond to the global operating environment which varies much more slowly than the local conditions. The global operating environment may be indicated by trends in the local operating conditions. For example, the frequency of engine speed changes and transmission gear-state changes, which are local operating conditions, could indicate whether the vehicle is in a city environment or a rural highway environment. In a city environment, it is desirable to reduce nitrogen oxide ($NO_x$) emissions, which contribute to smog, but this is at the expense of increasing carbon dioxide ($CO_2$) emissions. Whereas the converse is true in a rural environment, where it is desirable to reduce $CO_2$ emissions at the expense of increasing $NO_x$ emissions.

Another difficulty encountered by traditional, distributed engine control systems is the inability to protect the engine from system failures which may be manifested in excessive temperatures or inadequate pressures. Traditionally, major system failures would result in either an immediate engine shutdown, or a simple diagnostic code which would alert the operator of the malfunction.

Another feature traditionally found in engine controllers, and especially in diesel engine controllers, is the ability to automatically control vehicle speed, generically referred to as cruise control. Most conventional systems utilize some form of engine fuel supply regulation to maintain a desired vehicle speed. However, heavy vehicles, such as loaded semi-trucks, often exceed the selected desired speed on long grades, since, even though little or no fuel is supplied to the engine, gravitational pull continues to accelerate the vehicle down an incline and requires manual braking to limit vehicle speed. Thus, these vehicle speed control systems have a limited region of control since they are not integrated with other vehicle systems.

A diagnostic or monitoring feature traditionally available in engine controllers, especially in commercial vehicle applications, is the ability to oversee vehicle operating speeds. For example, excessive road speeds may be logged by the controller for later review by the vehicle owner to encourage safe operation and discourage excessive stoppage by the vehicle operator. However, this often results in less than optimal vehicle performance since many operators may maintain a speed lower than necessary to avoid having an excessive speed code logged against them. For example, if the owner sets the excessive speed code at 58 m.p.h. then the operator may attempt to maintain a speed of only 53 m.p.h. to avoid crossing that threshold. Furthermore, the operator cannot take advantage of the momentum gained when descending grades if the vehicle speed would exceed the established limit. Both of these scenarios result in decreased overall fuel economy and unnecessary braking.

The desire to provide application specific vehicles at a competitive price has led to the availability of a number of customer options which may include some of the systems already noted such as vehicle speed control, engine speed control, or engine torque control. This in turn has lead to a large number of possible subsystem combinations, thus increasing the costs associated with manufacturing and assembly as well as the cost of field service due to the large number of spare components which must be manufactured and stored.

It is desirable to have an electronic control unit capable of integrating the control of various engine functions and associated vehicle systems thus eliminating inter-controller communication delays and harmonizing engine control with other vehicle subsystems. An additional benefit accrues from replacing independent stand-alone controllers with a comprehensive controller, thus reducing part proliferation in the manufacturing, assembly, and service environments, leading to an associated reduction in the cost of these functions.

It is also desirable in optimizing overall vehicle performance, to have an electronic control unit which coordinates control of the combustion process with other systems and subsystems to adapt to changing operating conditions for the purpose of minimizing noise and emissions while improving qualitative engine attributes such as idle quality. For example, noise is most prevalent in diesel engines at idle or under low load conditions. It is therefore desirable to modify the combustion process in those situations to reduce ignition delay which results in a reduction of noise. Furthermore, it is desirable to carefully control the combustion process to balance the power output of individual cylinders to improve the idle quality while also reducing noise.

It is further desirable to modify the combustion process to adapt to changing global conditions, since this optimizes emissions at all times. This is a distinct advantage over traditional controller systems which attempt to average emissions over all operating conditions, which leads to less than optimal performance in vehicles which are exclusively used in city environments or in rural environments.

It is also desirable to have a single electronic control unit capable of controlling various subsystem configurations which may contain components produced by different manufacturers. This allows further reduction in part proliferation and accrues the benefits already noted. For example, the recently proposed Truck Maintenance Council (TMC) standard requires that a cooling fan control module be capable of controlling any one of four fan configurations including a single one-speed fan, dual one-speed fans, a single two-speed fan, or a single variable speed fan. This simplifies maintenance by reducing the burden of matching appropriate component parts with compatible controllers.

It is also desirable to implement vehicle speed control with an electronic control unit which integrates control of fuel delivery with engine braking and engine accessory load. This expands the authority of the vehicle speed control by providing ancillary speed limiting capabilities in addition to restricting fuel delivery to the engine.

In enhancing vehicle performance, and especially in optimizing fuel economy, it is desirable to monitor the vehicle speed to alert the operator of an impending excessive speed violation in time for an appropriate action prior to the violation actually being logged. Furthermore, it is desirable to allow the vehicle speed to exceed the selected maximum speed without logging a violation under certain conditions, such as when the vehicle is descending a grade or coasting after descending a grade.

It is also desirable to protect the engine from system malfunctions while allowing the operator to safely bring the vehicle to a stop. For example, if oil pressure is insufficient for safe engine operation, it is desirable to steadily decrease the output torque of the engine so that the vehicle can be maneuvered to an acceptable location and an orderly engine shut-down performed to avoid catastrophic engine failure while not endangering the operator.

It is further desirable to protect other vehicle systems and components, such as the transmission, by limiting the engine output torque and output speed under certain operating conditions. One advantage of controlling engine output torque is utilizing a single engine family (engines with similar output torque) with a plurality of transmission families, since the engine torque can be limited to the rated torque of the transmission. Similarly, engine torque can be limited to protect drive line components when mechanical torque multiplication is greatest, as when the transmission is in its lowest gear, but allowing full engine torque in higher gears, thus reducing the necessity of downshifting, such as when climbing hills at highway speeds.

In controlling systems or functions, such as engine output torque or output speed, it is desirable to utilize the largest system gain which results in an acceptable overshoot, to decrease the response time of the control system while increasing its accuracy.

SUMMARY OF THE INVENTION

It is, therefore, an object of the present invention to provide a control system which employs a single electronic control unit to integrate the various functions of engine control with associated subsystems control.

It is an additional object of the present invention to provide a control system having a single electronic control unit for controlling various cooling fan configurations while integrating control of the cooling fan system with various speed governors.

Another object of the present invention is to provide a method of monitoring the vehicle speed of a vehicle, and alerting the operator of its status, to optimize overall vehicle performance, especially fuel economy.

Yet another object of the present invention is to provide a method of controlling the road speed of a vehicle which expands the authority of the speed control system such that fuel delivery control is integrated with engine braking and engine accessory load.

Still another object of the present invention is to provide a method for controlling engine output torque which adapts to changing operating conditions and therefore has the ability to protect the engine from various subsystem failures.

Finally, an object of the present invention is to provide a method of controlling a compression-ignition internal combustion engine which optimizes emissions, noise, and qualitative engine attributes such as idle quality, by responding to changes in the local operating conditions as well as the global operating environment.

In carrying out the above object and other objects and features of the present invention, a method is provided to improve response time of a control system for an apparatus while improving accuracy and precision of the control by utilizing a dynamic system gain which adjusts to operating parameters.

Preferably, the above control system includes a single electronic control unit and the apparatus is a compression-ignition internal combustion engine. Also preferably, the parameter being controlled is engine speed, the first filter is a simple first-order lead and lag filter, and the second filter is an integrating filter. The step of controlling the apparatus includes controlling the engine combustion by at least one of the following means: modifying fuel delivery, modifying exhaust pressure, or modifying engine load.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 5b illustrates a typical timing diagram characterizing the operation of an integrating timer used in the system for monitoring vehicle speed shown in FIG. 5a;

BEST MODE FOR CARRYING OUT THE INVENTION

Figure 1:
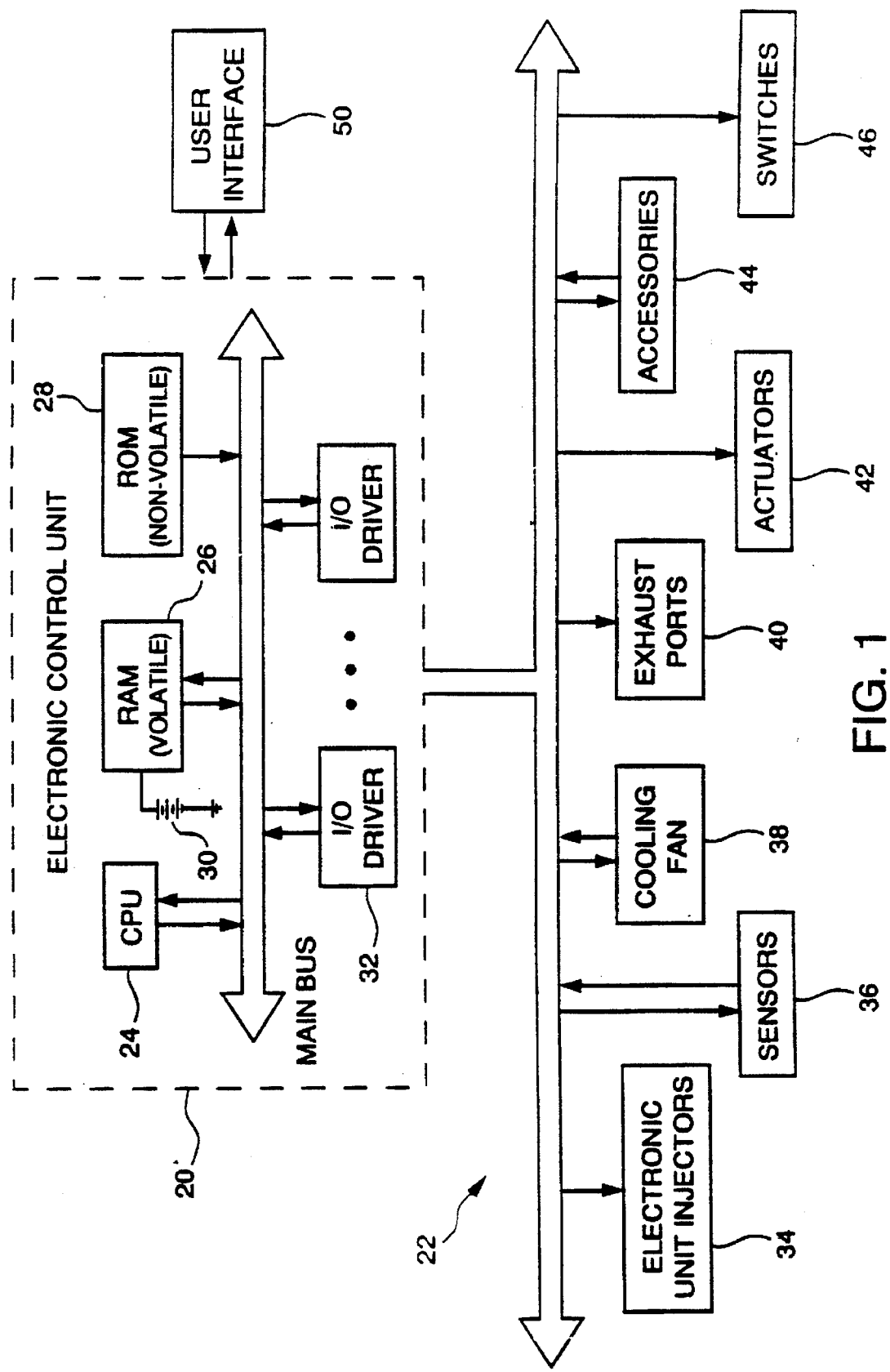
FIG. 1 is a block diagram of an integrated control system for a compression-ignition internal combustion engine in accordance with the present invention.

Referring now to FIG. 1, there is shown an electronic control unit (ECU) 20 in communication with typical engine componentry, shown generally by reference numeral 22, and a user-interface 50. As shown, the ECU 20 includes a microprocessor 24 having volatile random-access memory (RAM) 26, nonvolatile read-only memory (ROM) 28, and a battery 30 to maintain at least a portion of the contents of RAM 26 when the main power supply is off or disconnected. Of course, the ECU 20 may contain other types of memory instead of, or in addition to, RAM 26 and ROM 28, such as EPROM or EEPROM memories, as is well known in the art.

The ROM 28 or other nonvolatile memory may contain instructions, which are executed to perform various control and information functions, as well as data tables, which contain calibration values and parameters which characterize normal engine operation. Microprocessor 24 imparts control signals to, and receives signals from, input and output (I/O) drivers 32. The I/O drivers 32 are in communication with the engine componentry 22 and serve to protect the controller from hostile electrical impulses, while providing the signals and power necessary for engine control according to the present invention. The ECU componentry detailed above is interconnected by data, address and control buses. It should be noted that there are a variety of other possible control schemes which include various combinations of microprocessors and electric or electronic circuits which could perform the same function.

With continuing reference to FIG. 1, preferably, engine componentry 22 includes: a plurality of electronic unit injectors (EUI) 34, each corresponding to a single engine cylinder; a plurality of sensors 36 for indicating engine operating conditions, such as coolant temperature, oil temperature, innercooler temperature, throttle position, turbocharger compressor boost, oil pressure, transmission gear state, cylinder position, or cylinder sequencing; at least one cooling fan 38; and exhaust ports 40. Engine componentry 22 also includes actuators 42 which may include solenoids, indicator lights, motors, or generators; accessories 44 which may include air conditioning and vehicle lights; and switches 46 for operating the accessories 44, or for selecting various engine operating modes, such as cruise mode, power mode, or economy mode. It should be appreciated that the ECU 20 may also be in communication with other vehicle componentry and microprocessors which control associated vehicle systems, such as the brakes or transmission.

The user-interface 50 is used to store user calibration parameters and retrieve engine historical information logged as a result of diagnostic or malfunction codes. User-calibration parameters may include adjustable limits such as desired engine oil life, maximum road speed or maximum engine speed. Engine historical information may include diagnostic information which is used to assist personnel performing routine maintenance, or troubleshooting malfunctions, as well as engine and vehicle operation data, which may be analyzed to evaluate vehicle operator performance in addition to vehicle performance.

Figure 2:
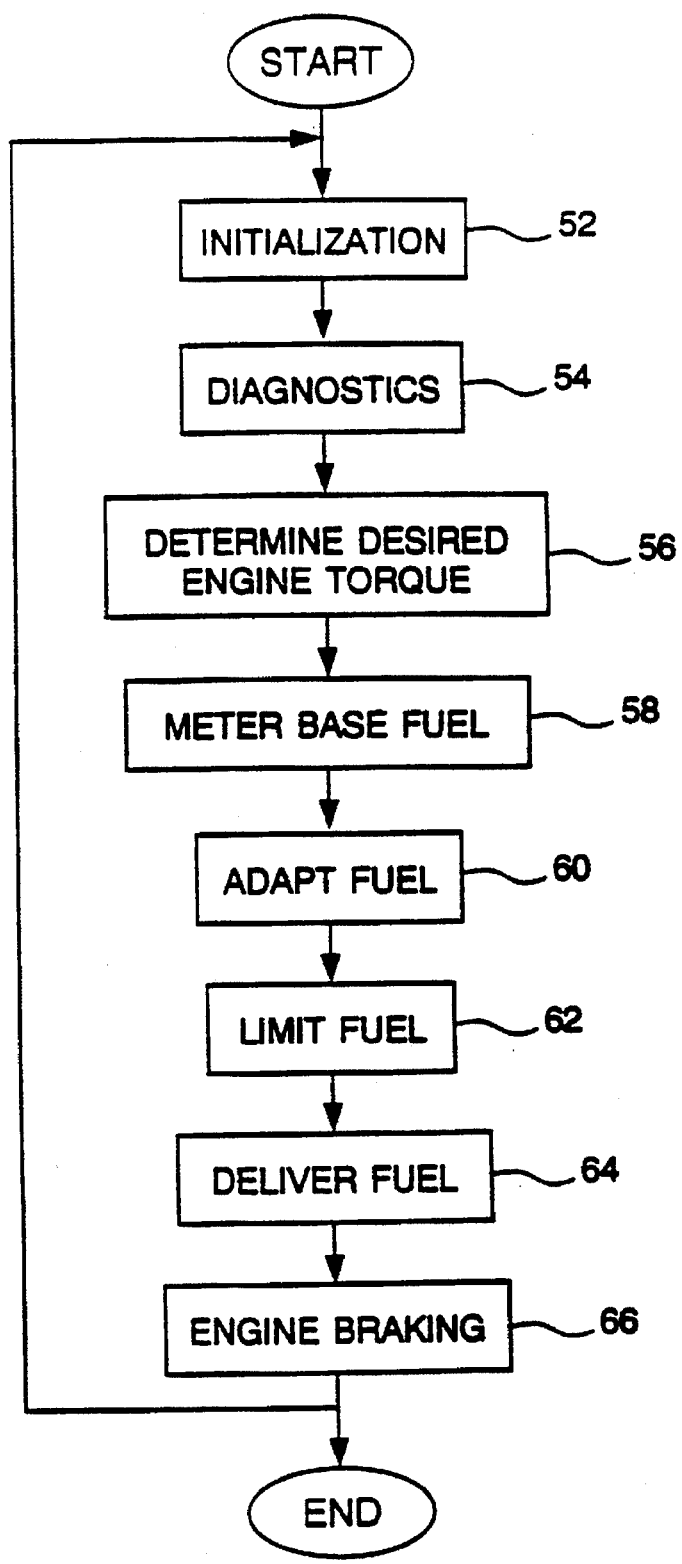
FIG. 2 is a flow chart illustrating the method of the present invention for integrating the modular control functions necessary for comprehensive control of a compression-ignition internal combustion engine.

Referring now to FIG. 2, a flow chart is shown which characterizes the functions of the method for comprehensive integrated control of an internal combustion engine according to the present invention. The flow chart depicts a typical processing order of these functions but, being modular, other logical progressions which achieve the same desired result may also be used. The initialization function 52 includes receiving inputs from the sensors 36 and representing the current engine operating conditions in the RAM 26 of the ECU 20. Appropriate timers and counters are also reset in preparation for subsequent functions in the processing cycle. This function further controls the outputs of the ECU 20 by decoding the contents of selected memory locations to actuate the corresponding engine componentry 22, as is well known in the art.

As shown in FIG. 2, the next function performed in the representative processing sequence of the preferred embodiment includes diagnostics 54 for detecting malfunctions of engine componentry 22 and taking appropriate actions. The actions may include effecting a change in engine operation, alerting the vehicle operator, or storing a malfunction code for later retrieval or subsequent action by another control module. For example, in the preferred embodiment, the diagnostics function performs a number of different tasks which include alerting the vehicle operator of a vehicle overspeed condition, activating the cooling fan if an appropriate sensor fault is detected, or adjusting engine accessory load to achieve a desired torque, as explained in greater detail below.

With continuing reference to FIG. 2, the third function 56 performed in the representative processing sequence of the preferred embodiment involves determining the desired engine torque for a particular engine cycle. This typically involves a combination of retrieving values from tables stored in ROM 28 and determining an appropriate torque based on these values. The retrieved values are a function of engine operating parameters, such as engine RPM, throttle position, or coolant temperature, such that a particular parameter value, or combination of values, corresponds to a memory location which contains the table entry. The resulting, desired engine torque, determined by this function is an initial value which is then communicated to additional control functions for further processing as described below.

In function 58, also shown in FIG. 2, the desired engine torque determined by function 56 is used to specify the quantity of fuel required to deliver that desired torque based on a plurality of engine operating conditions. In the preferred embodiment, the quantity of fuel is represented as an angular displacement of the crank required to energize a control solenoid associated with an EUI 34 for allowing fuel to be injected into the cylinder. Furthermore, as detailed below, the desired torque can be attained by allocating the quantity of fuel to be injected into a particular cylinder, to more than one discrete fuel injection. Thus, in any cylinder, during a single firing cycle, fuel is injected during at least one discrete fuel injection event. As is known, this method is effective in reducing combustion noise when near idle speed which is associated with ignition delay.

The quantity of fuel determined by function 58 may be adjusted by function 60, which performs cylinder balancing, to enhance qualitative attributes such as noise and vibration. For example, in the preferred embodiment, if the engine speed is at or close to idle speed, the pulse width signal to the integral fuel pump injectors may be adjusted to more evenly distribute the power contribution of each cylinder. This is desirable due to variations in the actual response of an EUI 34 to a commanded pulse width signal. Without cylinder balancing according to the present invention, if an identical pulse width signal is provided for each cylinder, at the same time of the firing cycle, the same amount of power will not necessarily be produced since the various injectors may respond differently. This is especially true under low fueling conditions. Existing control systems which do not account for this phenomenon often result in rough or imbalanced operation which contributes to engine vibration when near idle speed.

The fuel limiting function 62 includes a plurality of governors which establish a static upper bound, a dynamic upper bound, or both, on the quantity of fuel to be delivered to each cylinder. Although the static upper bounds can be set by the original equipment manufacturer (OEM), they may be changed by a user through the user-interface 50, and then remain fixed until a subsequent user modification. Unlike the static upper bounds, the dynamic upper bounds respond to varying engine operating conditions and so perform an adaptive or learning control function. Most preferably, the road speed governor of the preferred embodiment restricts fuel delivery when road speed exceeds the static upper bound. This limit may be changed through the user-interface 50 to accommodate a particular user application. The idle governor, however, utilizes a dynamic upper bound to control engine idle. This limit may depend on operating conditions, such as coolant temperature, where a lower coolant temperature would allow a higher idle speed than would a higher coolant temperature.

Continuing now, with reference to FIG. 2, function 64 controls fuel delivery to the engine cylinders by energizing the control solenoid of the appropriate EUI 34, at the appropriate time, for the period of time determined by function 62. Thus, function 64 determines the starting time of fuel delivery, referred to herein as the beginning of injection (BOI). Preferably, function 64 also performs an adaptive control function which adjusts the BOI based on factors such as the current operating mode (cruise, start, cold, or smoke control), air temperature, engine speed, engine load, or rate of increase of engine speed.

Function 66 controls engine braking for assisting in decelerating the vehicle or maintaining a desired speed without engaging the service brakes of the vehicle. In the preferred embodiment, the vehicle operator can limit the power dissipated through engine braking to one of four levels, with a manual selector switch which is one of the many switches 46, shown in FIG. 1. Engine braking is requested by the ECU 20 upon receiving a deceleration request after reducing fuel delivery to zero. A deceleration request may be initiated either in cruise control mode by the ECU 20 when the vehicle speed exceeds the set cruising speed by a calibratable amount, or by the vehicle operator when not in cruise by fully releasing the throttle pedal. The preferred embodiment effects engine braking by increasing exhaust stroke pressure, or by increasing engine accessory load by enabling the cooling fan in addition to increasing exhaust stroke pressure when maximum power dissipation is requested. It is within the contemplation of the present invention to control other engine accessories for increasing accessory load, in addition to modifying exhaust stroke pressure to effect various degrees of engine braking. A detailed example further illustrating the above described method follows, in the discussion of FIG. 4.

As shown in FIG. 2, the processing of the above functions is continuously repeated although, as already noted, the particular processing order depicted is not the only order possible to achieve the desired result. Functions may be invoked in any appropriate order which includes sequential execution as well as interrupt-driven execution, as is well known in the art.

Figure 3:
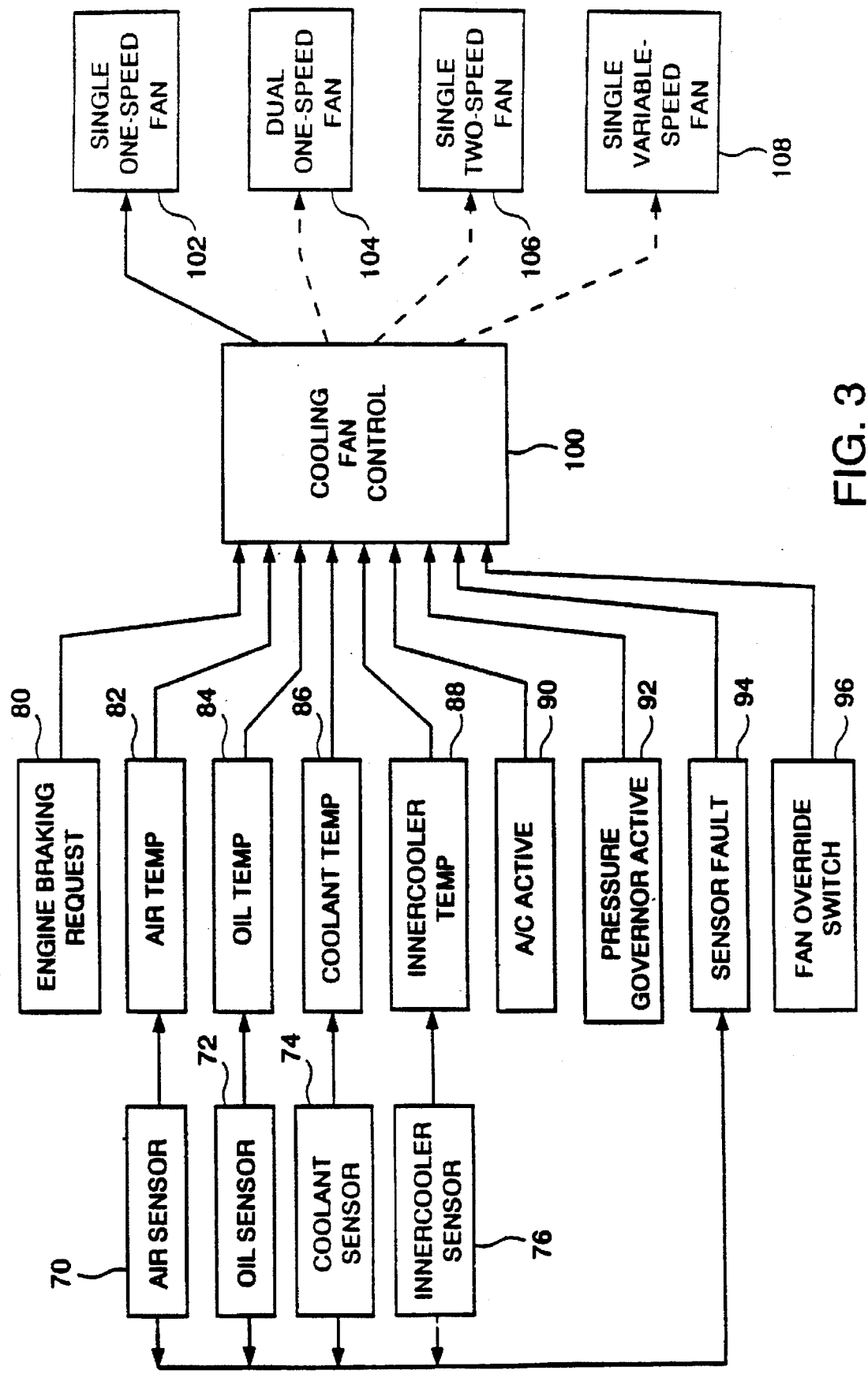
FIG. 3 is a block diagram illustrating the integrated cooling fan control module of the present invention including its inputs and possible outputs.

Referring now to FIG. 3, a block diagram illustrating the flexibility of the integrated cooling fan control module of the preferred embodiment is shown. The module consists of the circuitry necessary to operate the various types of cooling fans 102–108 in addition to instructions stored in the ECU 20 to effect control of a particular fan configuration. The preferred embodiment is shown with a solid line connecting the cooling fan control module 100 with a single one-speed fan 102. The preferred embodiment is, however, capable of controlling any of the cooling fan configurations depicted as indicated by the dashed lines connecting them to the cooling fan control module 100.

The air sensor 70 is positioned to detect the temperature of the intake air and is operably connected to an I/O driver 32 of the ECU 20. As shown in FIG. 3, the signal generated by the air sensor is converted to a corresponding temperature in the air temperature module 82 of the ECU 20, for further processing by the cooling fan control module 100.

Similarly, sensors shown in FIG. 3, including the oil sensor 72, the coolant sensor 74, and the innercooler sensor 76, are each connected to corresponding I/O drivers 32 of the ECU 20 for processing by their corresponding modules 82-88 for further action by the cooling fan control module. Furthermore, each sensor is monitored by function 94 for detecting malfunctions, such as a short circuit or an open circuit. When a sensor malfunction is detected, function 94 communicates which sensor has malfunctioned and the type of the malfunction, to the cooling fan control module 100 for further processing.

As also shown in FIG. 3, the cooling fan control 100 monitors the state of the air conditioning (A/C) compressor indicated by the "A/C active" input 90, as well as the "Pressure Governor Active" input 92. The pressure governor is present on vehicles employing auxiliary pumps, such as fire engines, for controlling engine speed to maintain a constant pump outlet pressure. The engine braking function 66, shown in FIG. 2, communicates with the cooling fan control 100, of FIG. 3, via the engine braking request 80 for enabling cooling fan operation to effect engine braking as previously mentioned and further detailed in the discussion of FIG. 4, below.

For the single, one-speed fan configuration 102, shown by the solid line connection in FIG. 3, the ECU 20 uses one digital output which is switched between battery power and ground to turn the fan on and off, respectively. The digital output circuits of the preferred embodiment are designed to sink no more than one amp DC current, although it is obvious that similar output circuits, having increased current sinking capabilities, could also be used. The cooling fan control 100 enables operation of the single, one-speed fan while at least one of the following conditions occurs, or for a predetermined period of time as noted: 1) oil temperature exceeds limit; 2) coolant temperature exceeds limit; 3) air temperature exceeds limit; 4) air conditioner is active (preferably fan remains on for 3 minutes after A/C is inactive); 5) sensor fault input 94 is active; 6) engine braking request 80 is active and engine braking selector switch indicates maximum braking (preferably fan remains on for at least 30 seconds); 7) pressure governor active input 92 is asserted; or 8) a fan control override switch 96 is enabled. The sensor fault input 94 is an element of the diagnostics 54 function shown in FIG. 2.

For the dual, one-speed fan configuration 104, shown connected by a dashed line in FIG. 3, two digital outputs of the ECU 20 are used. Each output switches a corresponding cooling fan between power and battery ground to turn the fan on or off, respectively. The first fan is operated while at least one of the following conditions occurs or for a predetermined time as noted: 1) air temperature exceeds limit; 2) A/C active input 90 is asserted (preferably fan remains on for 3 minutes after A/C is inactive); 3) air temperature sensor fails; 4) engine braking request 80 is active and engine braking selector switch indicates maximum braking (preferably fan remains on for at least 30 seconds); 5) pressure governor active input 92 is asserted; or 6) a fan control override switch, not shown, is enabled. The second fan is operated when one of the following conditions occurs: 1) oil temperature exceeds limit; 2) coolant temperature exceeds limit; or 3) the oil, or coolant temperature sensor fails.

The single, two-speed fan configuration 106, also shown connected by a dashed line in FIG. 3, also uses two digital outputs from the ECU 20. The fan is operated on low speed when the first digital output is enabled and is operated on high speed when the second digital output is enabled. The two digital outputs are mutually exclusive so that only a single one may be enabled at any one time. The cooling fan is operated at high speed when: 1) oil temperature exceeds limit; or 2) coolant temperature exceeds limit. Whereas, low speed fan operation is enabled if any of the conditions 3)-8), detailed above for the single, one-speed fan configuration 102, occurs.

The single, variable-speed fan configuration 108 uses a pulse-width modulated (PWM) output from the ECU 20 to drive the fan. The fan speed is inversely proportional to the duty cycle of the PWM signal so that a duty cycle of 0% corresponds to maximum speed whereas a duty cycle of 100% turns the fan off. Preferably, the fan speed will ramp up to the requested speed at a rate of 10% duty cycle per second. The cooling fan control 100 determines the fan speed and the corresponding PWM duty cycle depending upon the condition which enables fan operation. If more than one of the conditions is enabled, the sensor requesting the highest fan speed prevails and the PWM duty cycle is set accordingly. The PWM output is initiated when at least one of the following conditions occurs: 1) oil temperature exceeds limit; 2) coolant temperature exceeds limit; 3) innercooler temperature exceeds limit; or 4) A/C active input 90 is asserted (preferably fan remains on for 3 minutes after A/C becomes inactive).

The preferred embodiment of the present invention includes a fan override switch 96, which is one of the switches 46 illustrated in FIG. 1, for manually overriding the normally automatic cooling fan operation. The fan override switch 96 causes the cooling fan to remain on whenever the engine is running.

Figure 4:
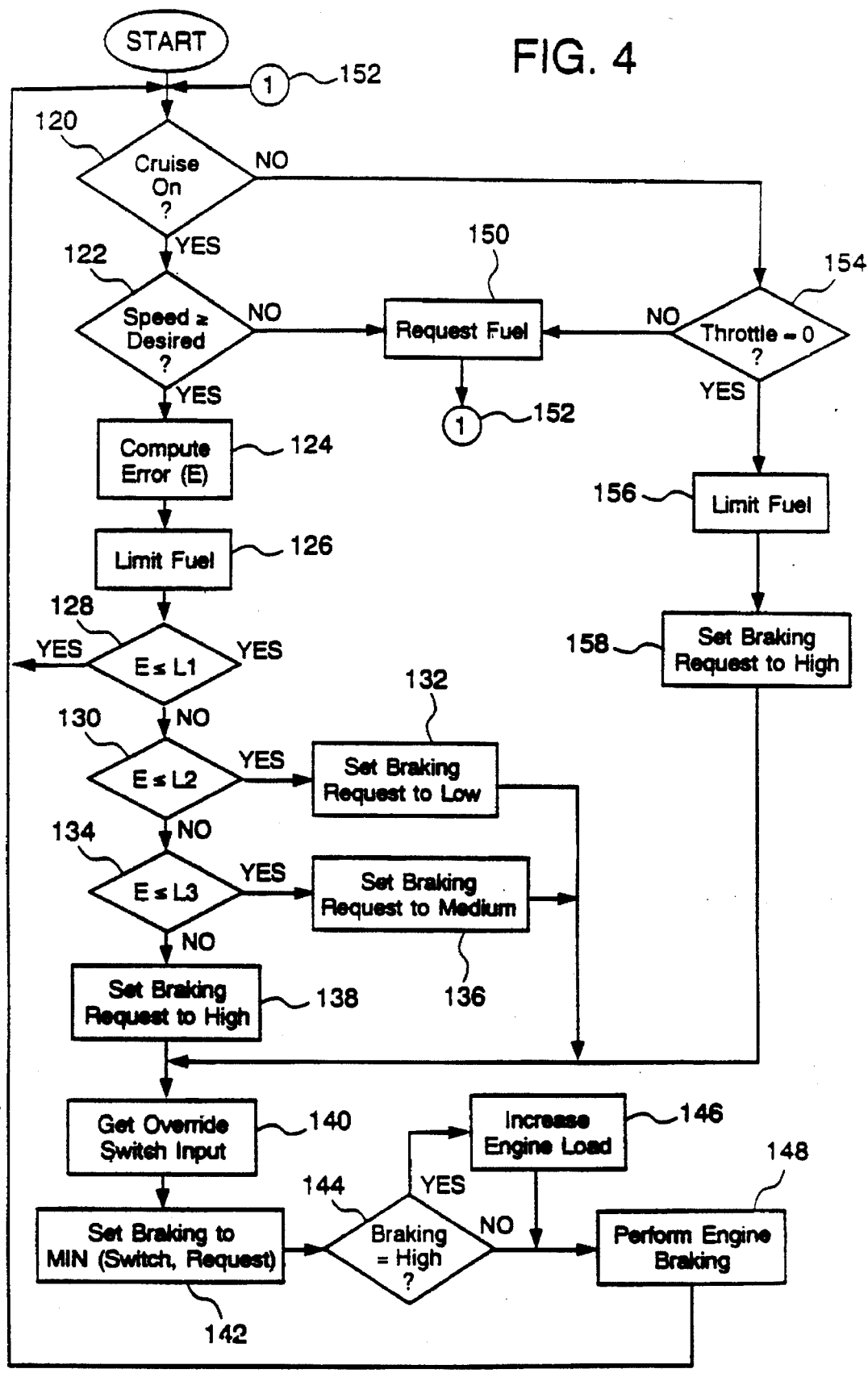
FIG. 4 is a flow chart illustrating the method of the present invention for controlling the road speed of a vehicle.

The flow chart shown in FIG. 4 illustrates the function for governing the road speed of a vehicle. This function enhances both manual and automatic vehicle speed control. It is integrated with engine braking control 66, as well as the cooling fan control module 100, to better control vehicle speed when descending long grades, by dissipating an appropriate amount of engine power.

In the preferred embodiment, four levels of engine braking are available, designated as off, low, medium, and high, which correspond to zero, minimum, moderate, or maximum additional power dissipation, respectively. Engine power is dissipated by increasing the exhaust stroke pressure of at least one of the cylinders, by increasing the engine load by actuating the cooling fan, or both. In a large diesel engine, the cooling fan may dissipate as much as 100 horsepower. By successively increasing the exhaust stroke pressure of a single cylinder or successively restricting the cylinder exhaust (and therefore increasing the exhaust stroke pressure) of an increasing number of cylinders, progressively more engine power is dissipated. For example, in the preferred embodiment of a six-cylinder diesel engine, low engine braking is provided by increasing the exhaust stroke pressure of two cylinders whereas medium engine braking increases the exhaust stroke pressure of four cylinders. High engine braking increases the exhaust stroke pressure of all six cylinders in addition to actuating the cooling fan to achieve a maximum amount of engine power dissipation.

As previously noted, it is within the contemplation of this invention to further enhance engine braking power dissipation by controlling additional accessories, such as air conditioning or air compressors, to further increase engine load. It is also contemplated in controlling such accessories, to disengage them under appropriate conditions thus decreasing power dissipation so that more torque can be transferred to the vehicle driveline. For example, engine load could be decreased under full throttle by disabling the cooling fan to maximize vehicle acceleration, or to better control vehicle speed when climbing hills, without the necessity of downshifting.

The preferred embodiment also employs an engine braking override switch, which is one of the switches 46 depicted in FIG. 1, to manually limit or completely disable engine braking. The switch enables the operator to limit the degree of engine braking to be applied, whether the vehicle is currently operating in either manual or automatic mode. Manual operation is the default mode of operation and is active when not in automatic, or cruise control mode. When manual mode is active, engine braking is requested when the operator releases the throttle pedal to its fully returned position, or zero fueling position. Maximum engine braking, subject to the override switch limit, is employed while in manual mode. In automatic, or cruise control mode, the degree of engine braking is controlled by the vehicle speed control function, also subject to the override switch limit, illustrated in FIG. 4 and detailed immediately below.

At step 120 of FIG. 4, a test is performed to determine whether manual or automatic mode is active. If cruise control is engaged, automatic mode is active and processing proceeds to step 122. The current vehicle speed (CVS) is compared to the desired vehicle (DVS) speed at step 122. If the CVS is less than DVS, then additional fuel is requested at step 150 and processing continues at step 152. Otherwise, if the CVS exceeds DVS, then the speed error is computed at step 124 to determine the appropriate action. At step 126, fuel is decreased in an attempt to reduce CVS to DVS. If this action is successful, then the speed error is reduced to an acceptable level tested at step 128 and processing starts over at step 120. If fuel is reduced to its minimum level, yet CVS still exceeds DVS, then processing continues to request an appropriate degree of engine braking in the steps following.

With continuing reference to FIG. 4, if the speed error is less than or equal to a second limit parameter at 130, the engine braking request is set to low at step 132 and processing continues at step 140. If the speed error is less than or equal to a third limit parameter, the engine braking request is set to medium at step 136 and processing continues at step 140. Otherwise, the engine braking request is set to high at step 138. Input from the engine braking override switch is processed at step 140. Step 142 sets the engine braking level to the lesser value indicated by the override switch and the engine braking request. At step 144, if the braking level determined by step 142 is set to high, then the engine load is increased at step 146 to further increase the engine braking. Otherwise, the set level of engine braking is effected at step 148 before starting the process over at step 120.

As further illustrated in FIG. 4, if manual mode is active at step 120, then the throttle position is checked at step 154 to determine the appropriate action. If the throttle is not near zero, then additional fuel is requested at step 150 and processing continues at step 152. Otherwise, if the throttle position is near zero, then fuel is reduced at step 156 in a similar fashion as previously described for step 126. If fuel limiting is unsuccessful at controlling the vehicle speed, processing continues at step 158. Otherwise, the processing starts over at step 120. A manual mode engine braking request is assumed to be at the maximum braking level allowed by the override selector switch. Thus, the engine braking request is set to high at step 158. Processing then continues at step 140 in the manner described above.

Figure 5A:
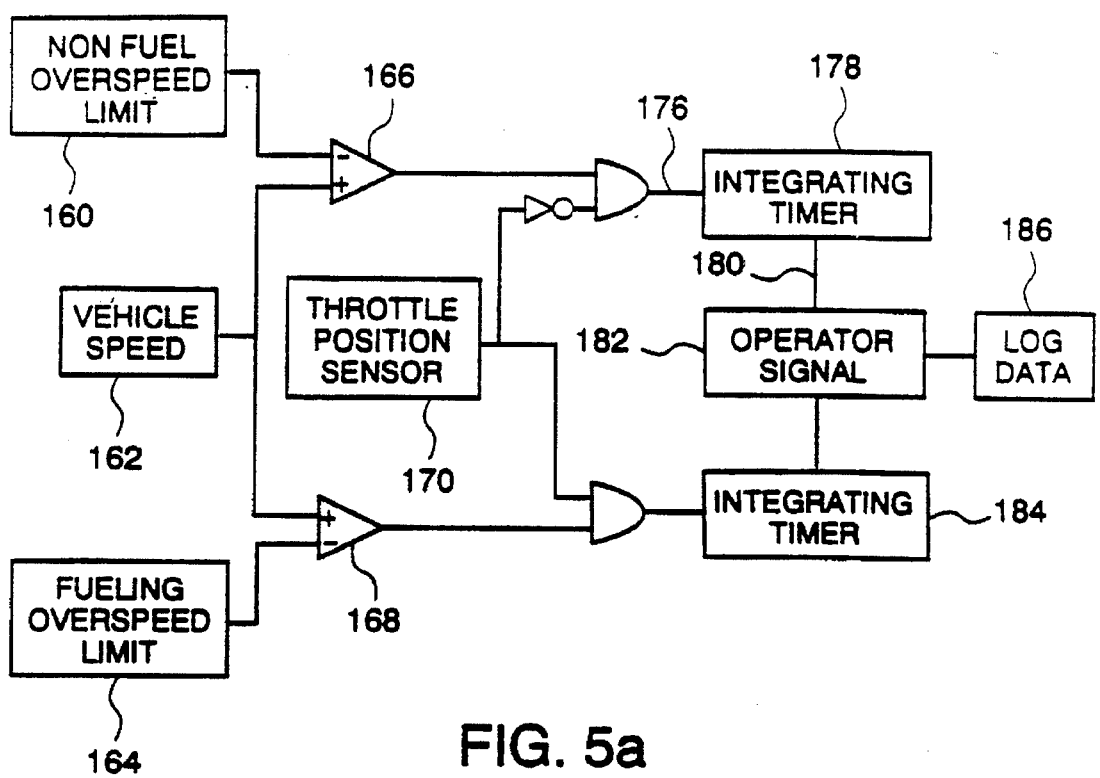
FIG. 5a illustrates a system for monitoring vehicle speed and alerting the operator according to the present invention.
Figure 5B:
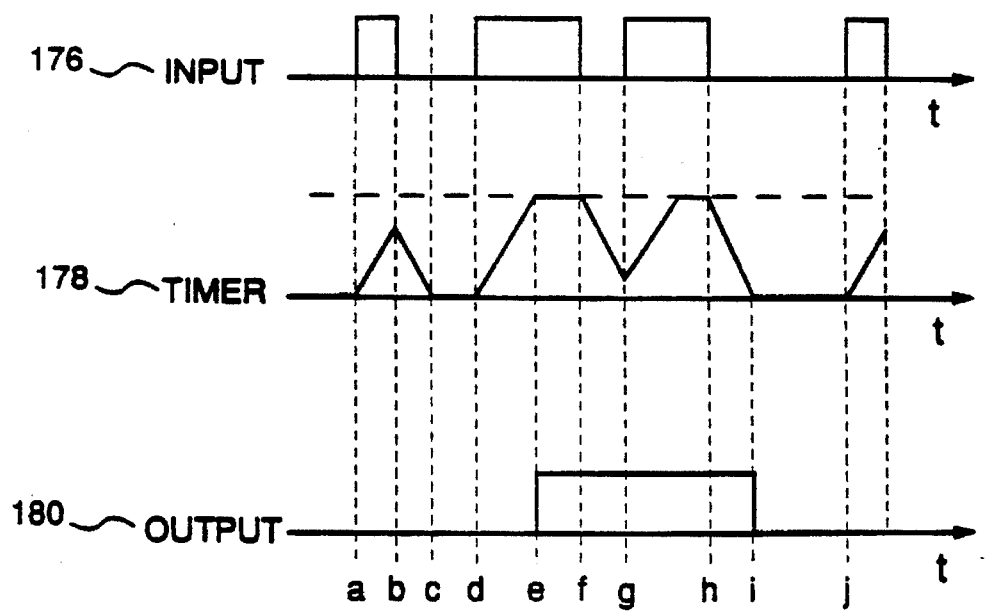

FIGS. 5a and 5b illustrate the programmable vehicle overspeed diagnostic module which is an element of the diagnostic function 54, previously described and illustrated in FIG. 2. This feature provides two upper diagnostic indicators to alert the vehicle operator of an excessive speed violation which will be logged by the ECU 20 if vehicle speed is not reduced within an allowable time. The first diagnostic indicates that the operator is depressing the throttle pedal (requesting fuel), while the vehicle speed has exceeded a lower limit, referred to as the "fueling overspeed limit" in the preferred embodiment. This is to encourage the operator to maintain a vehicle speed which is fuel efficient while not being threatened by an excessive speed violation being logged. The second diagnostic indicates that the operator has released the throttle pedal (the vehicle is coasting) and the vehicle speed has exceeded a higher limit, referred to in the preferred embodiment as the "no-fuel overspeed limit". This is provided to allow the operator to take advantage of the momentum gain while descending a grade without an excessive speed violation being logged, yet still keeping the vehicle speed below an unsafe level.

As explained in greater detail below, in the preferred embodiment, the vehicle operator is alerted to the diagnostic code indicating an excessive speed violation by illuminating a lamp, such as one of the actuators 42 illustrated in FIG. 1, which is located within the operator cabin. Of course, any other visual or audio indicator could be utilized to alert the vehicle operator, such as a bell, buzzer, or even an image on a head-up-display (HUD), as is well known in the art.

Referring now to FIG. 5a, the value of the vehicle speed 162 is determined by processing the signal received from a vehicle speed sensor, not specifically illustrated for the sake of clarity. The vehicle speed 162 is compared at function 166 to the no-fuel overspeed limit 160 while also being compared at block 168 to the fueling overspeed limit 164. If the vehicle speed 162 is greater than the no-fuel overspeed limit 160, and the throttle position sensor 170 indicates the throttle pedal is released, then the input 176 of an integrating timer 178 is enabled. Once the integrating timer 178 reaches its preset limit, the timer output 180 is asserted and an operator signal 182 is energized. Once the operator signal 182 is energized, an overspeed violation is logged 186 thereby recording the time and date of the first and last violation, the maximum vehicle speed attained, the engine life in hours, the duration of the violation, and the number of violations. Similarly, if the vehicle speed 162 is greater than the fueling overspeed limit 164, and the throttle position sensor 170 indicates the throttle pedal is depressed, then a different integrating timer 184, with the same principles of operation as timer 178, is enabled. The processing then continues at step 182 as described above. As also noted above, in the preferred embodiment, the operator signal 182 consists of illuminating a dash lamp, although a number of other visual or audio indications could easily be employed.

Referring now to FIG. 5b, the operation of an integrating timer, such as those used by the system of the present invention described immediately above, and illustrated in FIG. 5a, is explained in greater detail. It should be noted that a timer can easily be thought of, and implemented, as a counter which counts elapsed time or counts clock cycles which represent a number of periods of elapsed time. Therefore, the following description is equally applicable to either a timer or a counter. This type of integrating timer or counter is used extensively by various control functions of the preferred embodiment.

Referring back to FIG. 5a, there is shown an integrating timer used to provide a time delay, which inherently provides some hysteresis, for preventing a rapidly oscillating signal at the timer input 176 from exciting a rapidly oscillating timer output 180. The integrating timers 178 and 184 are reset to a value of zero during the initialization function 52, previously detailed and shown in FIG. 2. As previously noted, the integrating timers 178 and 184 utilize the same principles of operation. Therefore, the following description of the operation of integrating timer 178 applies also to integrating timer 184.

Returning now to the timing diagram of FIG. 5b, at point a, the timer input 176 is enabled and the timer begins to count. The integrating timer 178 will continue to increment until the timer input 176 is disabled, or until a preset value is attained. FIG. 5b depicts the preset value of the integrating timer 178 by a dashed line above the time axis. At point b, the timer input 176 is disabled so the integrating timer 178 is decremented, but not reset. The integrating timer 178 continues to be decremented, since the timer input 176 is disabled, until it is clamped to a value of zero at point c. The timer input 176 is again enabled at point d and the integrating timer 178 begins incrementing. The integrating timer is clamped at its preset value at point e and the timer output 180 is asserted.

In the preferred embodiment, an overspeed violation is logged when the output of either integrating timer 178 or 184 is asserted, as at point e of FIG. 5b. This allows the vehicle operator to exceed the preset speed, which is either the fueling overspeed limit or the no-fuel overspeed limit, for a period of time before an excessive speed code is logged. This time period is cumulative, however, and is not reinitialized until the vehicle speed is below the appropriate limit for a period of time at least as long as the vehicle speed was above the limit.

Also, as shown in FIG. 5b, at point f, when the timer input 176 is disabled, the integrating timer 178 begins to decrement, although the timer output 180 is still asserted, since the integrating timer 178 has not reached zero. At point g, the timer input 176 is again enabled so the integrating timer 178 again begins to increment and will be clamped at its preset value as before. At point h, the timer input 176 is once again disabled so the integrating timer 178 begins decrementing until being clamped to a value of zero at point i, where the timer output 180 is then disabled. The process continues in a similar manner at point j.

Figure 6A:
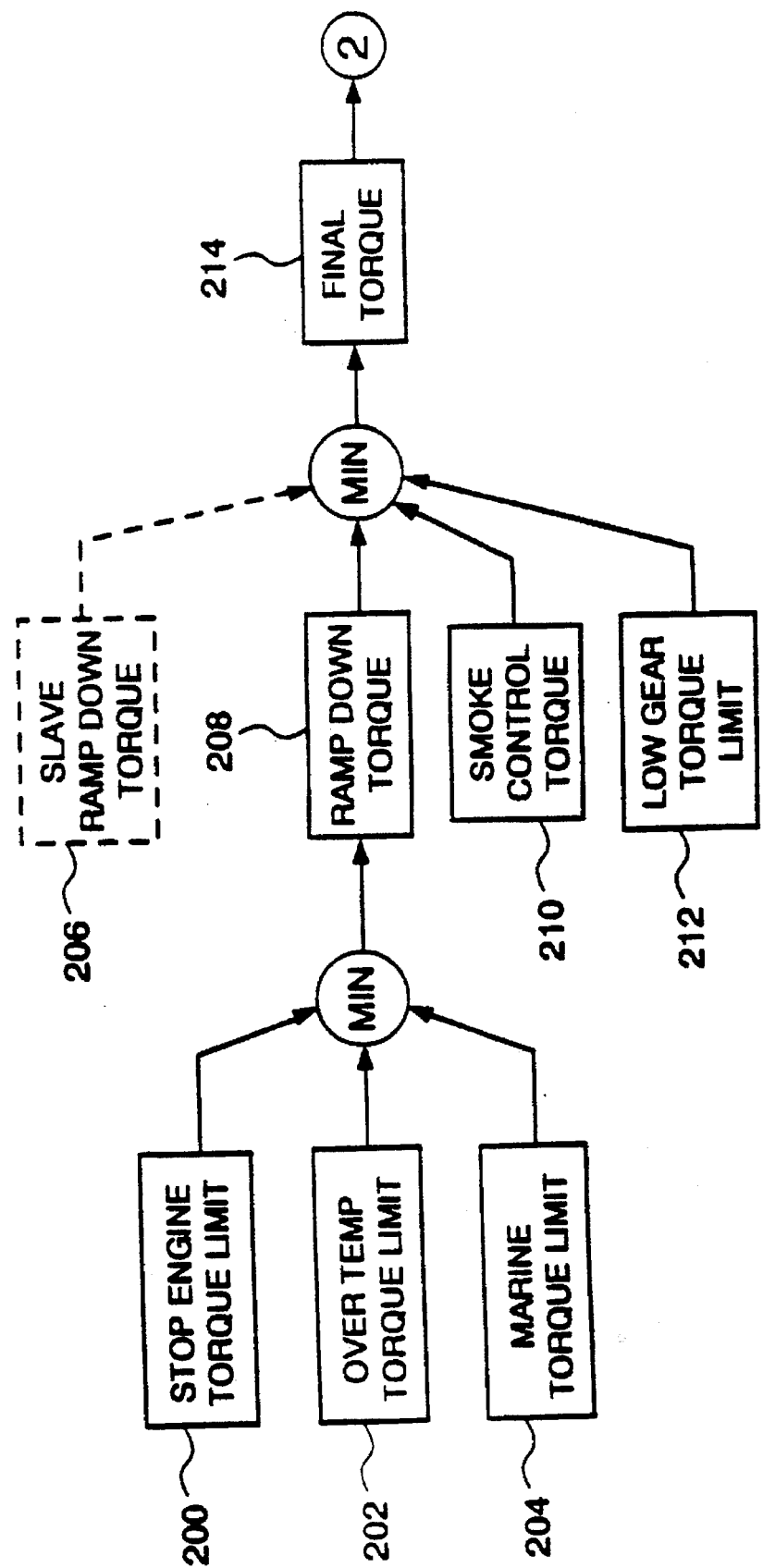
FIG. 6a is a block diagram illustrating the method of the present invention for engine output torque control in communication with the associated functions of integrated engine control.

The method of the present invention for engine output torque control is shown in FIG. 6a. The final torque 214 depends upon a number of engine operating conditions and results from a number of intermediate torque calculations as follows. The Rampdown Torque (RDTQ) 208 is the lowest value of the Stop Engine Torque Limit 200, Over Temp Torque Limit 202, and the Marine Torque Limit (ML$_{TQ}$) 204 where ML$_{TQ}$ is defined by the following equation:

$$ML_{TQ} = D_{TQLMT} * (1 + TQ_{ADJ}) + \left( \frac{tq_{trret} - TMR}{tq_{trret} - tq_{trrst}} \right) *$$
$$(MAX_{TQ} - D_{TQLMT} - (D_{TQLMT} * TQ_{ADJ}))$$

wherein $D_{TQLMT}$ is the desired torque limit which is stored in a look-up table referenced by current engine rotational speed; $TQ_{ADJ}$ is a torque adjustment parameter stored in one of several look-up tables referenced by engine rotational speed and the Active Rating Number (ARN); the ARN reflects the rated torque capacity of a particular engine rating; tq$_{trret}$ is the torque timer ending time; MAX$_{TQ}$ is the maximum torque for the rating; tq$_{trrst}$ represents the torque timer starting time; and TMR represents the torque limiting timer which determines the allowable time to maintain full torque.

FIG. 6a also shows the Stop Engine Torque Limit (SETQ) 200, which is a ramping function of time such that, when a stop engine sequence is initiated, this function begins to decrease the allowable torque over a preset time interval. A stop engine sequence is initiated to protect the engine when a serious malfunction is detected, which includes excessive engine fluid temperatures or pressures. The Over Temp Torque Limit (OTTQ) 202 decreases the allowable engine torque as a function of engine oil temperature or engine coolant temperature. However, this is a weighted function of average torque. Average torque is obtained by passing the torque through a first-order lag filter with a time constant representative of the heat storage potential of the engine taken as a single lumped mass. Thus, the reduction of torque is based on the filtered torque to avoid unnecessary torque reduction due to fluctuations in the instantaneous torque level.

The Slave Rampdown Torque 206 is calculated in a similar manner as RDTQ 208 by a slave electronic control unit, when present, which is in communication with the ECU 20. The Smoke Control Torque (SCTQ) 210 is a function of air manifold pressure in an effort to reduce particulate emissions. The Low Gear Torque Limit (TRLLIM) 212 is set according to the rated torque capacity of the transmission and driveline components to limit engine torque when mechanical torque multiplication is greatest. A Virtual Gear Ratio (VGR) is calculated to determine when TRLLIM 212 is applicable by dividing the current engine rotational speed by the vehicle speed in miles per hour. If VGR is above a predetermined value, then low gear torque limiting is active.

With continuing reference to FIG. 6a, Final Torque 214 will be set to zero if the engine is being shut down for idle shutdown, a stop engine condition has terminated, or if the engine is overboosted. An overboosted condition often results when alternative fuels, such as compressed natural gas or methanol, are used, and the vehicle operator requests a sudden deceleration (but not to zero throttle) resulting in excessive air in the combustion chambers. Torque is limited in this situation to prevent a misfire. If a vehicle speed sensor fault is detected, or the vehicle speed is below a predetermined value, or VGR is above a different predetermined value, Final Torque 214 will be set to the minimum of Slave RDTQ 206, RDTQ 208, SCTQ 210, and TRLLIM 212. Otherwise, Final Torque 214 will be the minimum of RDTQ 208 and SCTQ 210. The Final Torque 214 is used to calculate the Final Torque Proportional (FTQP) which is the ratio of the desired final torque to the maximum available torque for the current engine operating conditions. The FTQP is used extensively in various other calculations. Once the desired Final Torque 214 is established, it is necessary to determine the amount of fuel required, as well as the appropriate time during the firing cycle to deliver the fuel, in order to deliver that torque. This method is illustrated in FIG. 6b and discussed immediately below.

Figure 6B:
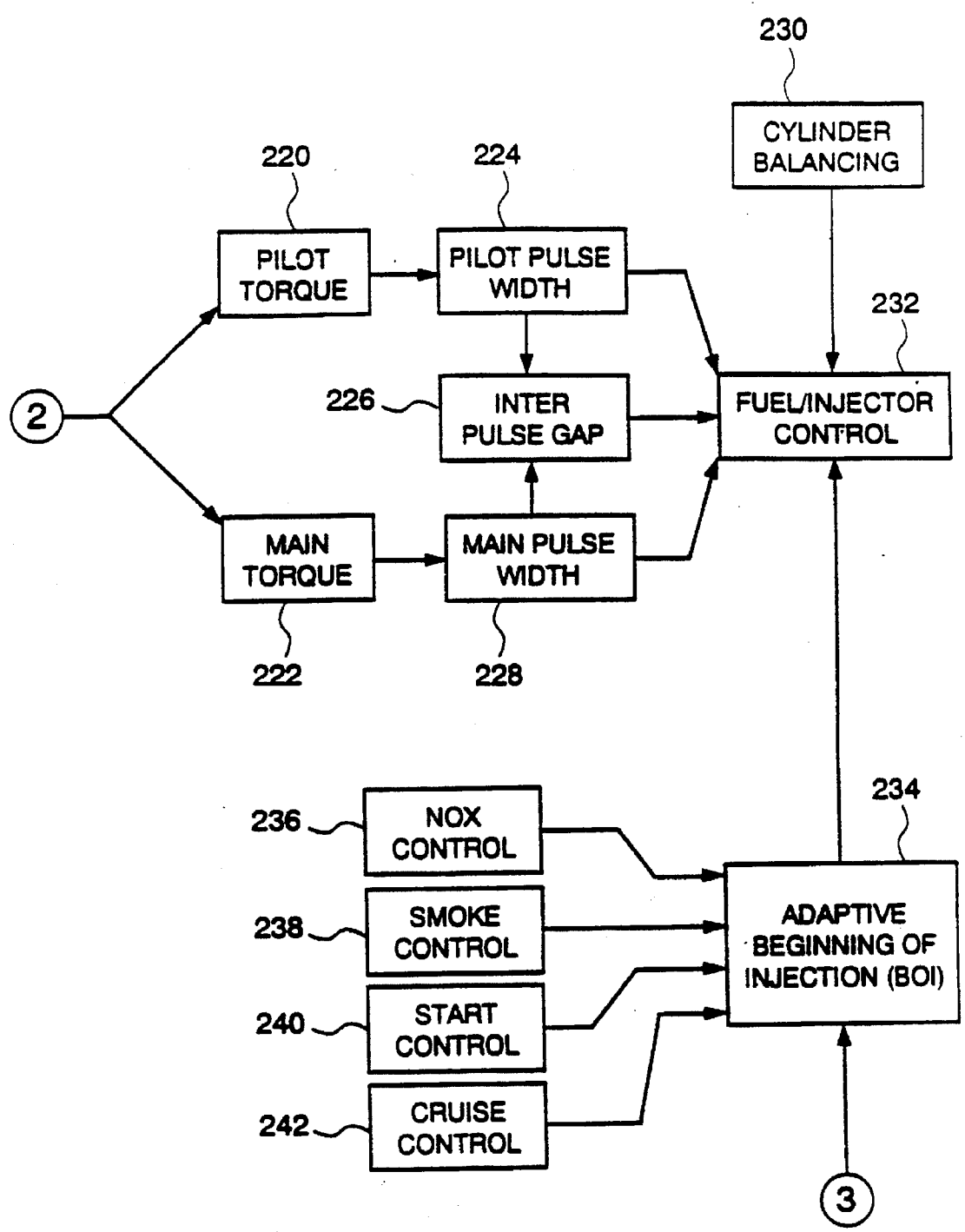
FIG. 6b is a functional block diagram illustrating the method of the present invention for controlling fuel delivery to an engine in communication with the associated functions of integrated engine control.

FIG. 6b illustrates the method for controlling fuel delivery to an engine, including metering the fuel and determining the timing of fuel delivery. As previously noted, when engine speed is near idle speed, noise can be reduced by reducing or eliminating ignition delay. This is accomplished by delivering the fuel in two discrete quantities and is referred to as split injection. Split injection consists of a first injection, called the pilot injection, followed by a delay, and then a second injection, referred to as the main injection. When operating conditions are appropriate, such as when the engine speed is below a predetermined level, and the idle governor is the active governor, split injection is enabled. Otherwise, the entire quantity of fuel is delivered by the first injection, or pilot injection, and there is no main injection.

As also shown in FIG. 6b, the Final Torque 214 is divided into a Pilot Torque (PTQ) 220 and a Main Torque (MTQ) 222. The value of PTQ 220 is the lesser of the Final Torque 214 and a pilot torque limiting value, EPIPTQ, not shown.

The value of MTQ 222 is simply PTQ 220 subtracted from the Final Torque 214. If split injection is disabled, then Final Torque 214 equals PTQ 220 and MTQ 222 equals zero.

The quantity of fuel to be delivered is represented by the amount of angular displacement of the crank, preferably measured in degrees, during which a control solenoid of an appropriate EUI 34 is energized. This signal is referred to as the fuel pulse width. Two Provisional Pulse Width (PROVPW) values are calculated, subject to further adjustment by other functions such as Cylinder Balancing 230, and limited by a maximum pulse width parameter, MAXPW. The value of PROVPW is found in a look-up table referenced by engine operating parameters, such as engine speed and desired torque. In the preferred embodiment, the desired torque used for this look-up function will be either MTQ 222 or PTQ 220 such that two PROVPW values are obtained. The Provisional Pilot Pulse Width (PPP) 224 corresponds to the value of PTQ 220 while the Provisional Main Pulse Width (PMP) 228 corresponds to the value of MTQ 222. The values of PPP 224 and PMP 228 are the lesser of PROVPW and MAXPW, with PROVPW corresponding to MTQ 222 or PTQ 220 as noted immediately above.

The delay between the pilot injection and the main injection is referred to as the Inter-Pulse Gap (IPG) 226. The value of IPG 226 is a function of the air temperature, oil temperature, and the injector rise time for the current cylinder being fired, and subject to a predetermined minimum gap time, $EPI_{GMN}$, as shown by the following equation:

$$IPG = \max(EPI_{GMN}, EPI_{IPG} - \tau_{IRT})$$

wherein $\tau_{IRT}$ represents the filtered injector rise time; "max ()" is a function which selects the greatest of the parenthetical values; and the value of $EPI_{IPG}$ is found in a look-up table stored in the ECU 20 referenced by the weighted sum of air temperature and oil temperature according to the equation:

$$EPI_{IPG} = \text{lookup}(K_{TW} * T_{air} + (1 - K_{TW}) * T_{oil})$$

wherein $K_{TW}$ is a temperature weighting factor, $T_{air}$ is the air temperature, and $T_{oil}$ is the oil temperature. The starting time of the main injection, referred to as MBOIT, is then equal to the IPG 226 added to the end of the pilot pulse injection time.

Figure 6C:
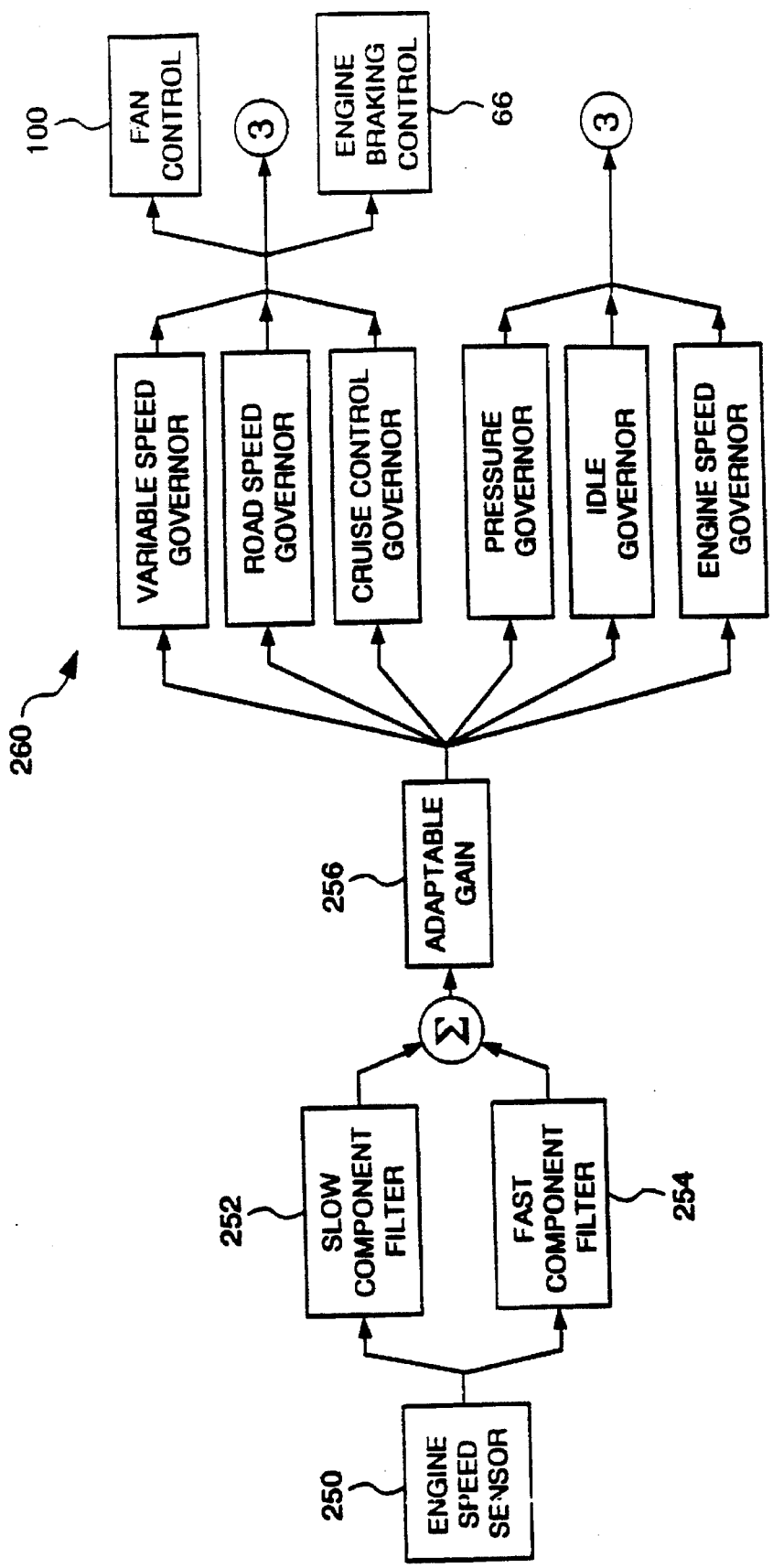
FIG. 6c is a functional block diagram illustrating the method for improving the response time of a control system, utilized by the system of the present invention, in communication with the associated functions of integrated engine control.
Figure 6D:
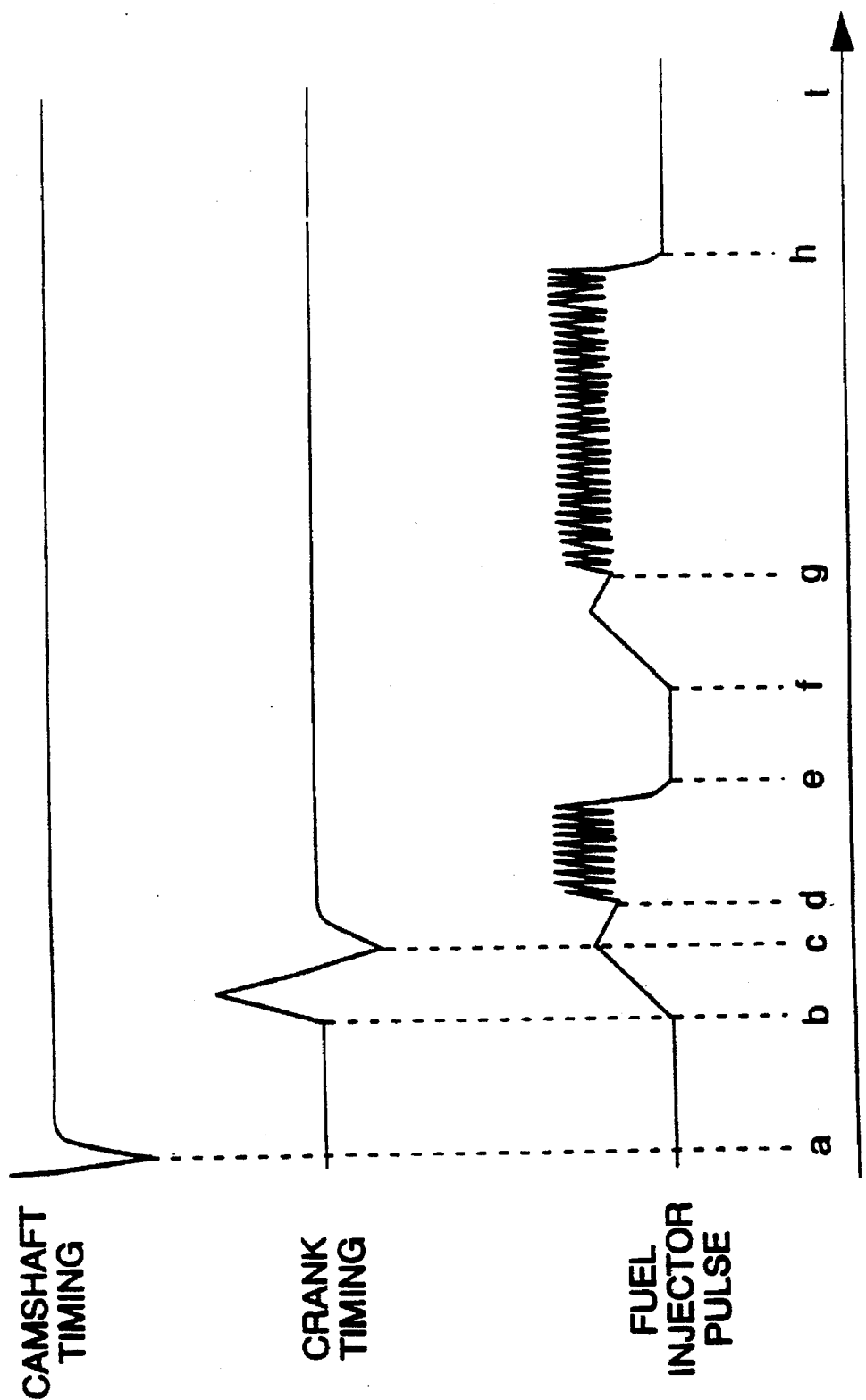
FIG. 6d is an illustration of a representative timing diagram showing the relationship among crank timing, camshaft timing, and electronic fuel injection for use with the present invention.

A representative trace illustrating the split injection function is shown in FIG. 6d. A trigger pulse from the camshaft sensor indicates the beginning of a firing cycle at point a. A pulse from the crank sensor determines the earliest possible starting time for the beginning of an injection cycle, which occurs when Cylinder Balancing 230 and Adaptive Beginning of Injection 234 are inactive. The current supplied to the control solenoid of the EUI 34 is increased from point b to point c, and then allowed to decay from point c to point d where the fuel injector pilot pulse begins. The pilot pulse ends and the IPG begins at point e. In a similar manner, after the IPG time has elapsed, the fuel injector main pulse begins at point g and ends at point h. The injection pulses are pulse-width modulated 40 reduce the overall current draw, a technique well established in the art.

Returning now to FIG. 6b, the Fuel Injector Control 232 determines an appropriate delay, if any, of the starting time of the pilot injection after the pulse received from the crank sensor. This time may be adjusted to accomplish Cylinder Balancing 230 or Adaptive Beginning of Injection 234, as previously noted.

The Cylinder Balancing function 230 is used to even out the contribution of each cylinder to overall power output while the engine is at or close to idle speed. If a first set of conditions is met, then adaptive cylinder balancing (ACB) is active, and a pulse width adjustment (PWA) factor for each cylinder is used to modify the pulse widths determined by PPP 224 and PMP 228. If a second set of conditions are satisfied in addition to the first conditions, then ACB is in "learn" mode and the PWA factor for each cylinder is recomputed every firing. The ACB feature is disabled for a number of conditions. Preferably the disabling conditions include: engine start mode active, cylinder cutout active, engine speed exceeds desired level for balancing, and fuel pulse width exceeds allowable limit for balancing.

With continuing reference to FIG. 6b, if ACB is enabled, the idle governor is active, engine speed is below a predetermined value, and oil temperature is above a predetermined value, then the Cylinder Balancing function 230 determines a balancing value for each cylinder by calculating the engine speed for a predetermined interval after the top dead center of the cylinder firing stroke. The PWA factor for the current cylinder is then updated according to the equations:

$$TMP = PWA_{old} + G * (RPM_{bal} - RPM_{avg})$$

$$PWA_{new} = \max(-ACB_{LIM}, \min(ACB_{LIM}, TMP))$$

wherein, as before, "max()" is a function which selects the largest of the parenthetical values, "min()" is a function which selects the smallest of the parenthetical values, $ACB_{LIM}$ is a limiting value for the adjustment, G represents a system gain factor, $RPM_{bal}$ is the balancing RPM for the current cylinder, and $RPM_{avg}$ is the average of the balancing RPM for the other cylinders. The Pulse Width Adjustment Time (PWAT) for each cylinder is then calculated according to the following equation:

$$PWAT = \frac{PWA * 60}{RPM_{inst} * 360}$$

wherein $RPM_{inst}$ represents the instantaneous engine RPM which is measured immediately before the pulse width is scheduled. Once each cycle (every cylinder having fired once), the PWA factors are normalized to have an average of zero, thus avoiding drift.

Still referring to FIG. 6b, the Adaptive BOI function 234 modifies the starting time of fuel delivery to enhance engine performance under varying operating conditions. The BOI is calculated at least as often as the analog values are read, but not necessarily every cylinder firing. The starting value for BOI, or SBOI, is determined by look-up tables referenced by ARN, engine speed, and engine load where the engine load may be either throttle position, FTQ 214, or FTQP. If Cruise Control 242 is the active governor, then a virtual engine load corresponding to full load may be used to reference the look-up tables.

An adaptive timing parameter (ATP) is used by the $NO_x$ Control 236 which assists in reducing $NO_x$ emissions under certain conditions. At the beginning of an ignition cycle, ATP is initialized to:

$$ATP = \frac{RPM_{rat} * NX_{APFC}}{2}$$

wherein the value of $RPM_{rat}$ is contained in a look-up table referenced by GVR which represents the maximum engine rotational speed, and $NX_{APFC}$ is a filter constant. Subsequently, the value of ATP represents the filtered value of the rate of increase of engine speed, computed according to the following equation:

$$ATP_{new} = ATP_{old} + NX_{APFC} * \left\{ \max\left(0, \frac{\Delta RPM}{t_i}\right) - ATP_{old} \right\}$$

wherein $t_i$ represents the time interval of the computation. The value of ATP is then used to determine the $NO_x$ compensated BOI ($BOI_{Nx}$) which is computed according to the equation:

$$BOI_{N_x} = \min\left(1, \frac{\max(0, NX_{maxp} - ATP)}{NX_{maxp} - NX_{minp}}\right) * BOI_{NXD}$$

wherein $NX_{maxp}$ is the maximum allowable value for $NO_x$ control; $NX_{minp}$ is the minimum allowable value for NOx control; and $BOI_{NXD}$ is contained in a look-up table referenced by ARN and engine speed.

As also shown in FIG. 6b, the value of NXBOIC may then be used by the adaptive BOI function 234 to determine the advanced beginning of injection (ABOI) which is communicated to the Fuel Injector Control 232. If the Start Control 240 is active, as when starting the engine, then ABOI is set to a value contained in a look-up table referenced by the engine speed. Whereas, if Smoke Control 238 is active, then ABOI is determined by summing the smoke control BOI (SCBOI) and the cold control BOI (CBOIAD). The values of SCBOI and CBOIAD are contained in look-up tables referenced by engine speed, and a weighted sum of air temperature and oil temperature, respectively. More precisely, the value for CBOIAD is referenced by the value of:

$$K_{TW}*T_{air} + (1-K_{TW})*T_{oil}$$

wherein $K_{TW}$ is a temperature weighting factor with a value between zero and unity, inclusive; $T_{air}$ is the air temperature; and $T_{oil}$ is the oil temperature.

If neither Start Control 240, Cruise Control 242, nor Smoke Control 238 is active, then ABOI is determined by summing SBOI, NXBOIC, and CBOIAD.

Referring now to FIG. 6c, a functional block diagram is shown illustrating the method for improving the response time of a control system by employing an adaptable system gain. In the preferred embodiment, this method is utilized to improve the response of the various governors, shown generally by reference numeral 260. These governors are integrated with the Cooling Fan Control 100, Engine Braking Control 66, and Adaptive BOI 234, as previously discussed and indicated in the figure by connector symbol 3.

Traditional controllers use a proportional-integral-differential (PID) control strategy. However, due to the resolution of typical engine speed sensors, and the rapid nature of the firing sequence of the engine, the computations of the control system lag behind the actual engine operation by at least two firing cycles. The preferred embodiment utilizes a finer resolution speed sensor, split processing, and a continuous adaptable gain to achieve a twofold increase in system bandwidth over the traditional PID control strategy. The Engine Speed Sensor 250 includes a 36-tooth encoder wheel. This improved resolution allows control computations to include the most recent cylinder firing which reduces the response time thereby increasing the accuracy of the control system. Furthermore, the signal from the Engine Speed Sensor 250 is separated into a slow component and fast component which are processed individually and then recombined. The Slow Component Filter 252 includes a proportional gain phase and lead/lag compensators, whereas the Fast Component Filter 254 includes an integrator. The filtered components are then recombined and the system applies a continuous Adaptable Gain 256 which increases with engine rotational speed. The various governors 260 utilize this enhanced engine speed signal, in concert with the other integrated functions previously discussed, to effect more accurate engine control.

Figure 7:
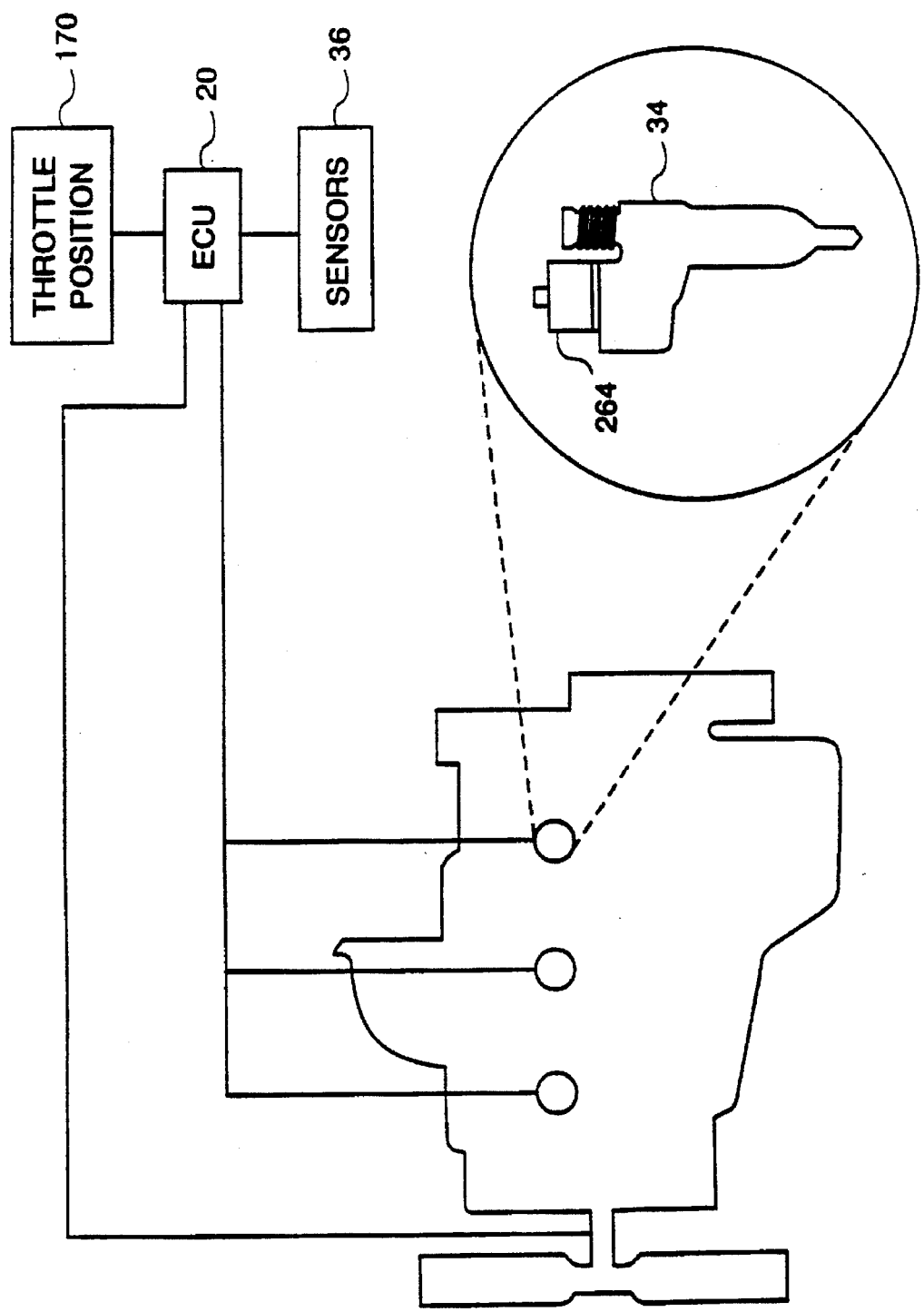
FIG. 7 is a block diagram illustrating the system for controlling the fuel delivery to the engine to achieve the desired output torque according to the present invention.

A block diagram depicting the fuel delivery control system of the preferred embodiment is shown in FIG. 7. This system utilizes an Electronic Unit Injector (EUI) 34, corresponding to each engine cylinder, which is actuated by energizing its Control Solenoid 264 with a fuel pulse generated by the Fuel Injector Control 232. The integral pump/injector construction offers several advantages over conventional in-line mechanical injectors, or distributor systems of which the most important is the higher strength and stiffness which allows higher injection pressures with minimum size and distortion. This allows an abrupt termination at the end of the fuel delivery phase, resulting in a cleaner injection, and thereby producing fewer particulate emissions.

It is understood, of course, that while the form of the invention herein shown and described constitutes the preferred embodiment of the invention, it is not intended to illustrate all possible forms thereof. It will also be understood that the words used are descriptive rather than limiting, and that various changes may be made without departing from the spirit and scope of the invention disclosed.

What is claimed is:

1. A method of controlling a compression-ignition internal combustion engine including an electronic control unit with memory for controlling the engine, a plurality of combustion cylinders each having an integral fuel pump-injector apparatus for delivering fuel to the cylinders, and a plurality of sensors for sensing engine operating parameters, the method comprising:

sensing a plurality of engine operating parameters to obtain associated operating signals;

determining a desired engine output torque based on the operating signals;

identifying a pilot output torque based on the operating signals and a main output torque based on the pilot output torque and the desired output torque according to:

$$Tq_1 = \min(Tq_{des}, Tq_{pilot})$$

and $$Tq_2 = Tq_{des} - Tq_1$$

wherein $Tq_1$ represents the pilot output torque, $Tq_2$ represents the main output torque, "min()" represents the lesser of the parenthetical values, $Tq_{des}$ represents the desired output torque, and $Tq_{pilot}$ represents a desired value for the pilot output torque for the cylinder being fired;

determining first and second quantities of fuel to produce the pilot output torque and the main output torque, respectively;

calculating a period to pause between delivery of the first and second quantities of fuel based on the operating signals;

determining a starting time for delivery of the first quantity of fuel based on the operating signals; and consecutively controlling each of the integral fuel pump-injector apparatus so as to deliver the first quantity of fuel to the associated combustion cylinder, pause for the calculated period, and deliver the second quantity of fuel to the associated combustion cylinder.

2. The method of claim 1 wherein the engine operating parameters include engine rotational speed and determining the desired output torque comprises obtaining a value stored in the electronic control unit based on the engine rotational speed.

3. The method of claim 1 wherein determining the first quantity of fuel comprises determining an interval of crank angular displacement for actuating the integral fuel pump-injector of the cylinder being fired according to the equation:

$$PPP=\min(PW_{prov}, PW_{max})$$

wherein PPP represents the interval, "min()" represents the lesser of the parenthetical values, $PW_{prov}$ represents a provisional interval stored in the memory, and $PW_{max}$ represents a maximum allowable interval for the engine stored in the memory.

4. The method of claim 3 wherein the engine operating parameters include engine rotational speed and wherein the provisional interval is obtained from the memory based on the engine rotational speed and the pilot output torque.

5. The method of claim 1 wherein determining the second quantity of fuel comprises determining an interval for actuating the integral fuel pump-injector of the cylinder being fired according to the equation:

$$PMP=\min(PW_{prov}, PW_{max})$$

wherein PMP represents the interval, "min()" represents the lesser of the parenthetical values, $PW_{prov}$ represents a provisional interval stored in the memory, and $PW_{max}$ represents a maximum allowable interval for the cylinder being fired stored in the memory.

6. The method of claim 5 wherein the engine operating parameters include engine rotational speed and the provisional interval is obtained from the memory based on the engine rotational speed and the main output torque.

7. The method of claim 1 wherein calculating the period is determined by evaluating:

$$IPG=\max(EPI_{gmn}, (EPI_{IPG}-\tau))$$

wherein IPG represents the duration of the period, $EPI_{gmn}$ represents a minimum allowable gap period, $\tau$ represents a filtered rise period for the integral fuel pump-injector of the cylinder being fired, and $EPI_{IPG}$ is a value for the gap period stored in the memory.

8. The method of claim 7 wherein the engine operating parameters include air temperature and oil temperature, and the value for the gap period stored in the memory is based on the value of:

$$K_{TW}*T_{air}+(1-K_{TW})*T_{oil}$$

wherein $K_{TW}$ is a predetermined temperature weighting factor with a value between zero and unity, inclusive, $T_{air}$ represents the air temperature, and $T_{oil}$ represents the oil temperature.

9. The method of claim 1 wherein the engine includes a cruise control function and means for sensing engine emissions, the engine operating parameters include the state of the cruise control module and engine rotational speed, and wherein determining the starting time for delivery of the first quantity of fuel comprises:

determining an initial beginning of injection value based on the state of the cruise control and the engine rotational speed;

determining a plurality of beginning of injection compensation values based on the engine operating parameters; and combining at least one of the plurality of compensation values and the initial beginning of injection value to obtain the starting time for delivery of the first quantity of fuel.

10. The method of claim 9 wherein determining a plurality of compensation values comprises:

determining a first compensation value for reducing $NO_x$ emissions;

determining a second compensation value for reducing particulate emissions manifested as smoke; and determining a third compensation value for altering fuel delivery when starting the engine.

11. The method of claim 10 wherein determining a first compensation value comprises:

initializing an adaptive timing parameter at the start of an ignition cycle according to the equation:

$$ATP = \frac{RPM_{rat} * NX_{APFC}}{2}$$

wherein $RPM_{rat}$ is the rated engine rotational speed and $NX_{APFC}$ is a filter constant;

calculating a new value for the adaptive timing parameter which represents the filtered value of the rate of increase of engine rotational speed according to the equation:

$$ATP_{new} = ATP_{old} + NX_{APFC} * \left\{ \max\left(0, \frac{\Delta RPM}{t_i}\right) - ATP_{old} \right\}$$

wherein $NX_{APFC}$ is a filter constant, "max" is a function which selects the largest of the parenthetical values, $\Delta RPM$ represents a change in engine rotational speed over a time interval represented by $t_i$; and evaluating the equation:

$$BOI_{N_x} = \min\left(1, \frac{\max(0, NX_{maxp} - ATP)}{NX_{maxp} - NX_{minp}}\right) * BOI_{NXD}$$

wherein $NX_{maxp}$ is the maximum allowable value for $NO_x$ control, ATP is the adaptive timing parameter, $NX_{minp}$ is the minimum allowable value for NOx control, and $BOI_{NXD}$ is a value based on the engine rotational speed.

12. The method of claim 10 wherein the engine operating parameters include engine air temperature and engine oil temperature and wherein the step of determining the second compensation value comprises:

obtaining a first value to reduce particulate emissions based on engine rotational speed;

obtaining a second value to reduce particulate emissions based on a weighted sum of the engine oil temperature and the engine air temperature; and summing the first value and the second value.

13. The method of claim 12 wherein obtaining the second value comprises retrieving the value from the memory based on:

$$K_{TW}*T_{air}+(1-K_{TW})*T_{oil}$$

wherein $K_{TW}$ is a predetermined temperature weighting factor, $T_{air}$ is the air temperature, and $T_{oil}$ is the oil temperature.

14. A method of controlling a compression-ignition internal combustion engine including an electronic control unit with memory for controlling the engine, a plurality of combustion cylinders each having an integral fuel pump-injector apparatus for delivering fuel to the cylinders, and a plurality of sensors for sensing engine operating parameters, the method comprising:

sensing a plurality of engine operating parameters to obtain associated operating signals;

determining a desired engine output torque based on the operating signals;

identifying a pilot output torque based on the operating signals and a main output torque based on the pilot output torque and the desired output torque according to:

$$Tq_1=\min(Tq_{des},Tq_{pilot})$$

and $$Tq_2=Tq_{des}-Tq_1$$

$Tq_1$ represents the pilot output torque, $Tq_2$ represents the main output torque, "min()" represents the lesser of the parenthetical values, $Tq_{des}$ represents the desired output torque, and $Tq_{pilot}$ represents a desired value for the pilot output torque for the cylinder being fired;

determining first and second quantities of fuel to produce the pilot output torque and the main output torque, respectively;

determining a pulse width adjustment factor for eacy cylinder for modifying the first and second quantities of fuel based at least one of the plurality of operating signals;

calculating a period to pause between delivery of the first and second quantities of fuel based on the operating signals;

determining a starting time for delivery of the first quantity of fuel based on the operating signals; and consecutively controlling each of the integral fuel pump-injector apparatus so as to deliver the first quantity of fuel to the associated combustion cylinder, pause for the calculated period, and deliver the second quantity of fuel to the associated combustion cylinder.

15. The method of claim 14 wherein the pulse width adjustment factor is determined according to:

$$TMP=PWA_{old}+G*(RPM_{bal}-RPM_{avg})$$

$$PWA_{new}=\max(-ACB_{LIM},\min(ACB_{LIM},TMP))$$

wherein "max()" is a function which selects the largest of the parenthetical values, "min()" is a function which selects the smallest of the parenthetical values, $ACB_{LIM}$ is a limiting value for the adjustment, G represents a system gain factor, $RPM_{bal}$ is a balancing value of the engine rotational speed for the current cylinder, and $RPM_{avg}$ is an average of the balancing values of previously fired cylinders.

16. The method of claim 15 wherein the engine includes a cruise control function and means for sensing engine emissions, the engine operating parameters include the state of the cruise control module and engine rotational speed, and wherein determining the starting time for delivery of the first quantity of fuel comprises:

determining an initial beginning of injection value based on the state of the cruise control and the engine rotational speed;

determining a plurality of beginning of injection compensation values based on the engine operating parameters; and combining at least one of the plurality of compensation values and the initial beginning of injection value to obtain the starting time for delivery of the first quantity of fuel.

* * * * *

UNITED STATES PATENT AND TRADEMARK OFFICE
CERTIFICATE OF CORRECTION

PATENT NO. : 5,647,317
DATED : July 15, 1997
INVENTOR(S) : S. MILLER WEISMAN, III, et al.

It is certified that error appears in the above-identified patent and that said Letters Patent is hereby corrected as shown below:

Column 19, Line 17, After "PPP" delete "-" and insert "=" so that equation reads:

$$PPP = \min(PW_{prov}, PW_{max}).$$

Signed and Sealed this

Thirtieth Day of June, 1998

Attest:

BRUCE LEHMAN

Attesting Officer     Commissioner of Patents and Trademarks